(12) United States Patent
Ito

(10) Patent No.: US 8,757,544 B2
(45) Date of Patent: Jun. 24, 2014

(54) AIRCRAFT CONTROL SURFACE DRIVE MECHANISM

(75) Inventor: Koji Ito, Gifu (JP)

(73) Assignee: Nabtesco Corporation, Tokyo (JP)

( * ) Notice: Subject to any disclaimer, the term of this patent is extended or adjusted under 35 U.S.C. 154(b) by 95 days.

(21) Appl. No.: 13/476,844

(22) Filed: May 21, 2012

(65) Prior Publication Data
US 2012/0305701 A1 Dec. 6, 2012

(30) Foreign Application Priority Data
Jun. 2, 2011 (JP) .................................. 2011-123906

(51) Int. Cl.
  *B64C 13/24* (2006.01)
  *B64C 13/28* (2006.01)
(52) U.S. Cl.
  USPC .......................................................... 244/99.3
(58) Field of Classification Search
  USPC ................................ 244/99.2–99.5, 213–217
  See application file for complete search history.

(56) References Cited

U.S. PATENT DOCUMENTS

| 4,544,118 | A | * | 10/1985 | Robinson | 244/225 |
| 4,605,187 | A | * | 8/1986 | Stephenson | 244/216 |
| 5,388,788 | A | * | 2/1995 | Rudolph | 244/215 |
| 6,685,138 | B1 | * | 2/2004 | Krantz | 244/99.5 |
| 6,698,688 | B1 | * | 3/2004 | Jones | 244/99.3 |
| 8,376,271 | B2 | * | 2/2013 | Saito et al. | 244/99.3 |
| 2010/0270426 | A1 | * | 10/2010 | Saito et al. | 244/99.7 |
| 2011/0139938 | A1 | * | 6/2011 | Itoh et al. | 244/226 |
| 2011/0220761 | A1 | * | 9/2011 | Ogawa et al. | 244/99.3 |

FOREIGN PATENT DOCUMENTS

| JP | 62-087247 | 6/1987 |
| JP | 2010-254167 A | 11/2010 |

* cited by examiner

*Primary Examiner* — Philip J Bonzell
(74) *Attorney, Agent, or Firm* — Studebaker & Brackett PC (57) ABSTRACT

An actuator includes a plurality of cylinder units each including a cylinder and a rod, and is pivotably attached, at a first end thereof, to a control surface. A reaction link is pivotably attached, at a first end thereof, to a fulcrum shaft rotatably supporting the control surface. The reaction link is pivotably attached, at a second end thereof, to a second end of the actuator between the plurality of cylinder units.

6 Claims, 7 Drawing Sheets

AIRCRAFT CONTROL SURFACE DRIVE MECHANISM

CROSS-REFERENCE TO RELATED APPLICATION

This application claims priority to Japanese Patent Application No. 2011-123906. The entire disclosure of Japanese Patent Application No. 2011-123906 is hereby incorporated herein by reference.

BACKGROUND OF THE INVENTION

1. Field of the Invention

The present invention relates to an aircraft control surface drive mechanism that is provided as a link mechanism including a hydraulically operated actuator and a reaction link connected to the actuator, and that drives a control surface of an aircraft.

2. Description of Related Art

An aircraft is provided with control surfaces that are formed as moving surfaces (flight control surfaces) and are configured as an aileron, an elevator, a rudder, and the like. As mechanisms for driving aircraft control surfaces, JP 62-87247U and JP 2010-254167A disclose aircraft control surface drive mechanisms that are provided as link mechanisms each including a hydraulically operated actuator and a reaction link connected to the actuator.

With the aircraft control surface drive mechanisms disclosed in JP 62-87247U and JP 2010-254167A, a first end of the actuator including a cylinder and a rod is pivotably attached to a control surface or a member attached to the control surface. Also, a first end of the reaction link is pivotably attached to a fulcrum shaft rotatably supporting the control surface. Meanwhile, a second end of the reaction link is pivotably attached to a second end of the actuator.

As disclosed in JP 2010-254167A, the reaction link is formed in the shape of a portal including a pair of linear portions and a connecting portion connecting the pair of linear portions. Also, this reaction link is attached to the control surface at a first end thereof at which the above-mentioned connecting portion is provided. Each of the two linear portions of the reaction link is disposed on the side of the cylinder of the actuator. Furthermore, the reaction link is attached to the cylinder of the actuator at a second end thereof provided as the respective ends of the two linear portions. By installing the reaction link as described above, the above-described aircraft control surface drive mechanism is configured to be able to stably drive the control surface via operation of the actuator and support a reaction force resulting from an output force from the actuator with the reaction link.

SUMMARY OF THE INVENTION

Recently, there is a need for coping with thinned wings, i.e., the reduction of the wing thickness, for the purpose of increasing the efficiency of the aircraft body to increase the fuel efficiency. Also, with the need for coping with thinned wings, there is a demand for increasing the compactness of the structure of the aircraft control surface drive mechanism that is installed in the wings and at control surfaces. In particular, for the aircraft control surface drive mechanism, efficient arrangement of the space for installing manifold structures in which various valve mechanisms and various ports for supply and discharge of pressure oil to and from the hydraulically operated actuator, is desired. That is, it is desirable to enable efficient arrangement of the installation space for manifold structures, thus increasing the overall compactness of the aircraft control surface drive mechanism.

In view of the above-described circumstances, it is an object of the present invention to provide an aircraft control surface drive mechanism that enables efficient arrangement of the installation space for manifold structures, thus increasing the overall compactness of the aircraft control surface drive mechanism.

According to a first aspect of an aircraft control surface drive mechanism of the present invention for achieving the above-described object, there is provided an aircraft control surface drive mechanism that is provided as a link mechanism including a hydraulically operated actuator and a reaction link connected to the actuator, and that drives a control surface of an aircraft, wherein the actuator includes a plurality of cylinder units each including a cylinder and a rod, and is pivotably attached, at a first end thereof, to the control surface or a control surface-side member attached to the control surface, and the reaction link is pivotably attached, at a first end thereof, to a fulcrum shaft rotatably supporting the control surface, and is pivotably attached, at a second end thereof, to a second end of the actuator between the plurality of cylinder units.

With this configuration, the reaction link is pivotably attached, at the first end, to the fulcrum shaft on the control surface side, and is pivotably attached, at the second end, to the actuator between the plurality of cylinder units. Accordingly, the aircraft control surface drive mechanism can stably drive the control surface via operation of the actuator, and can support a reaction force resulting from an output force from the actuator with the reaction link. Moreover, the reaction link is connected, at the second end, to the actuator between the cylinder units, and therefore, the area surrounding the actuator is widely open. That is, unlike conventional aircraft control surface drive mechanisms, the aircraft control surface drive mechanism provides, in the area surrounding the actuator, wide open spaces, one of which is located laterally to the direction of arrangement of the cylinder units, and the other is located perpendicularly to that direction of arrangement. Then, the manifold structures can be installed in these open spaces. Accordingly, the installation space for the manifold structures can be arranged efficiently, and therefore, the overall compactness of the aircraft control surface drive mechanism can be increased.

Thus, the above-described configuration enables efficient arrangement of the installation space for the manifold structures, thus increasing the overall compactness of the aircraft control surface drive mechanism.

According to a second aspect of an aircraft control surface drive mechanism of the present invention, in the aircraft control surface drive mechanism of the first aspect, the plurality of cylinders of the actuator are formed integrally or joined integrally.

With this configuration, the plurality of cylinders of the actuator are formed or joined integrally, and therefore, it is possible to increase the rigidity of the actuator while suppressing any increase in weight. This can efficiently ensure further stability of operation with a light-weight structure.

According to a third aspect of an aircraft control surface drive mechanism of the present invention, in the aircraft control surface drive mechanism of the first aspect, the actuator further includes a rod end portion that joins the respective rods of the plurality of cylinder units and that is pivotably connected to the control surface or the control surface-side member.

With this configuration, the rod end portion is provided that joins the plurality of rods of the actuator and is connected to the control surface or the control surface-side member. Accordingly, it is possible to efficiently prevent the occurrence of a force fight in which the plurality of cylinder units bias the control surface in opposite directions due to displacement between the positions of the rods. This can efficiently achieve further stability of operation and the synchronization of operation.

According to a fourth aspect of an aircraft control surface drive mechanism of the present invention, in the aircraft control surface drive mechanism of the first aspect, the reaction link is provided with a widened portion that is formed so as to spread in a width direction, which is a direction perpendicular to a longitudinal direction of the reaction link, toward an end portion thereof at the first end pivotably attached to the fulcrum shaft.

With this configuration, the reaction link is provided with the widened portion that spreads in the width direction toward the first end attached to the fulcrum shaft, i.e., toward the control surface side, such that the geometrical moment of inertia increases. Accordingly, it is possible to efficiently support, with the reaction link, a reaction force acting on the reaction link from the control surface as a result of an output force acting on the control surface side from the actuator, while suppressing any increase in weight.

According to a fifth aspect of an aircraft control surface drive mechanism of the present invention, in the aircraft control surface drive mechanism of the first aspect, the reaction link is pivotably attached, in two locations at the first end, to the fulcrum shaft, and is pivotably attached, in one location at the second end, to the second end of the actuator.

With this configuration, the reaction link is connected to the fulcrum shaft in two locations at the first end, and is connected to the actuator in one location at the second end. Therefore, the reaction link is connected to the control surface side and the actuator side at the vertex portions of a triangle. Accordingly, it is possible to achieve a link structure that can further stably support, with the reaction link, a reaction force acting on an output force of the actuator via the control surface.

According to a sixth aspect of the aircraft control surface drive mechanism of the present invention, in the aircraft control surface drive mechanism of the fifth aspect, the actuator is pivotably connected, in two locations at the first end, to the control surface or the control surface-side member.

With this configuration, the reaction link is connected to the fulcrum shaft in two locations at the first end, and is connected to the actuator in one location at the second end. Also, the actuator is connected to the control surface side in two locations at the first end. Accordingly, the reaction link and the actuator are connected, at the vertex portions of a quadrangular pyramid, to the control surface side and the wing side to which the control surface is rotatably attached. Accordingly, it is possible to achieve a link structure that can stably support any possible external force acting on the reaction link and the actuator in the bending direction or the torsional direction, and can suppress deformation caused by such external force. This allows the rigidity of the aircraft control surface drive mechanism to be increased, while suppressing any increase in weight.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. It should be appreciated that the present invention is not limited to the configurations illustrated in the following embodiment, and can be widely applied to an aircraft control surface drive mechanism for driving a control surface of an aircraft.

Figure 1:
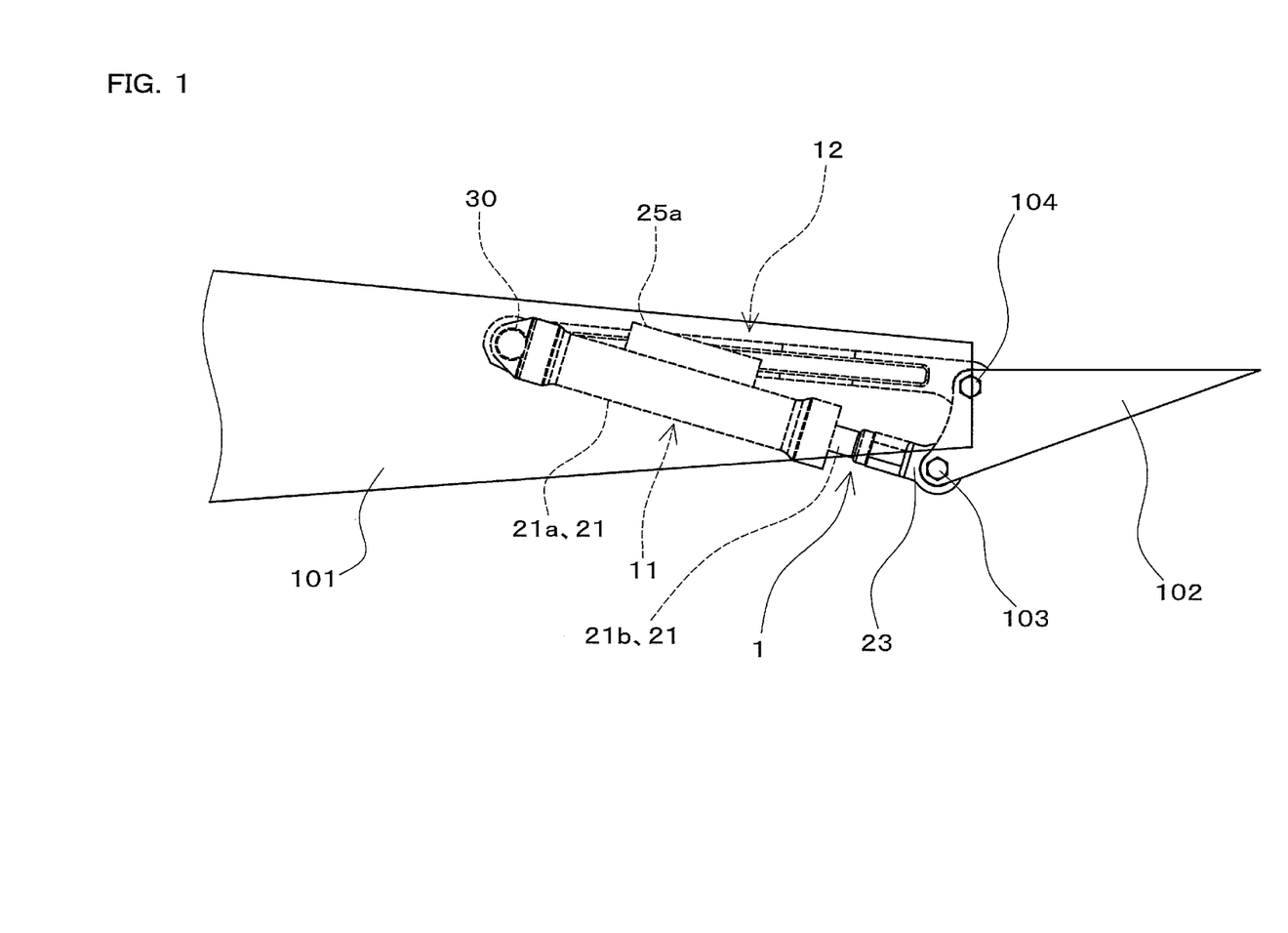
FIG. 1 is a schematic diagram showing a state in which an aircraft control surface drive mechanism according to one embodiment of the present invention has been attached to a wing and a control surface of an aircraft.

FIG. 1 is a schematic diagram showing a state in which an aircraft control surface drive mechanism 1 according to one embodiment of the present invention has been attached to a wing 101 and a control surface 102 of an aircraft. The aircraft control surface drive mechanism 1 (hereinafter, also simply referred to as the "control surface drive mechanism 1") shown in FIG. 1 is installed in the aircraft, with has its principal part omitted in this illustration showing only the wing 101 and the control surface 102 in FIG. 1. The control surface drive mechanism 1 is used for driving the control surface 102 of the aircraft.

Note that examples of aircraft moving surfaces (flight control surfaces) constituting the control surface 102 include an aileron, a rudder, and an elevator. The control surface drive mechanism 1 may also be used as a mechanism for driving a control surface configured as a flap, a spoiler, and the like.

Figure 2:
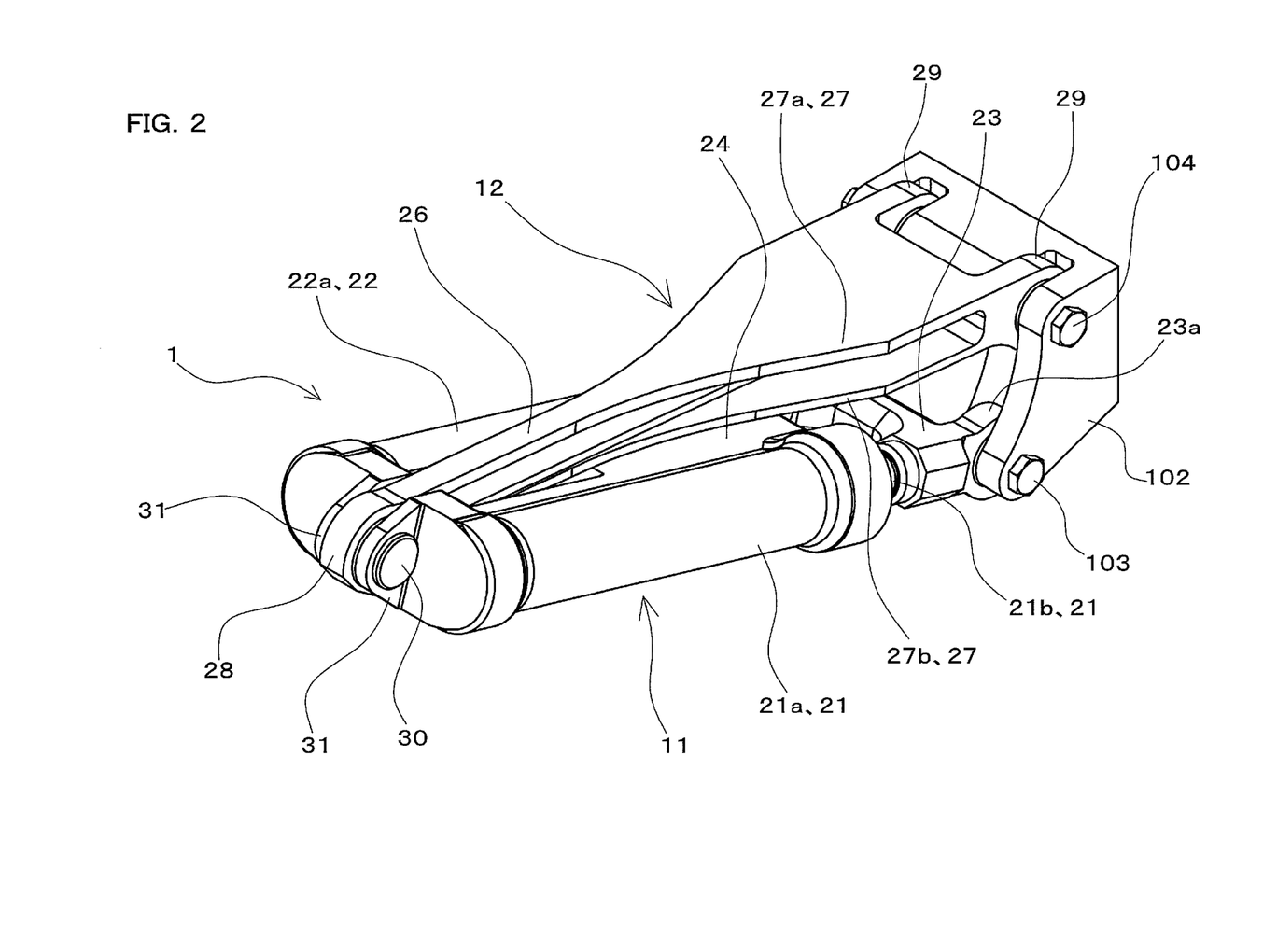
FIG. 2 is a perspective view of the aircraft control surface drive mechanism shown in FIG. 1.
Figure 3:
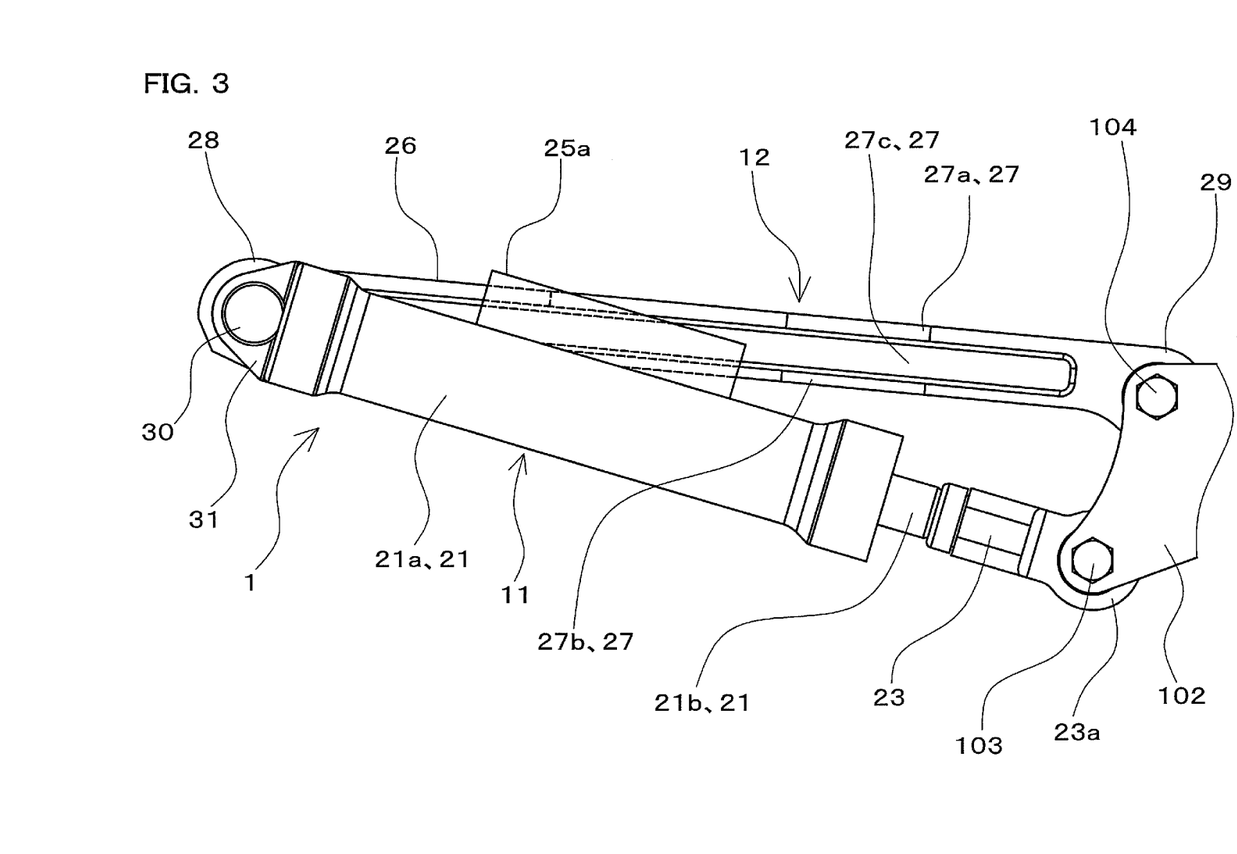
FIG. 3 is a side view of the aircraft control surface drive mechanism shown in FIG. 2.
Figure 4:
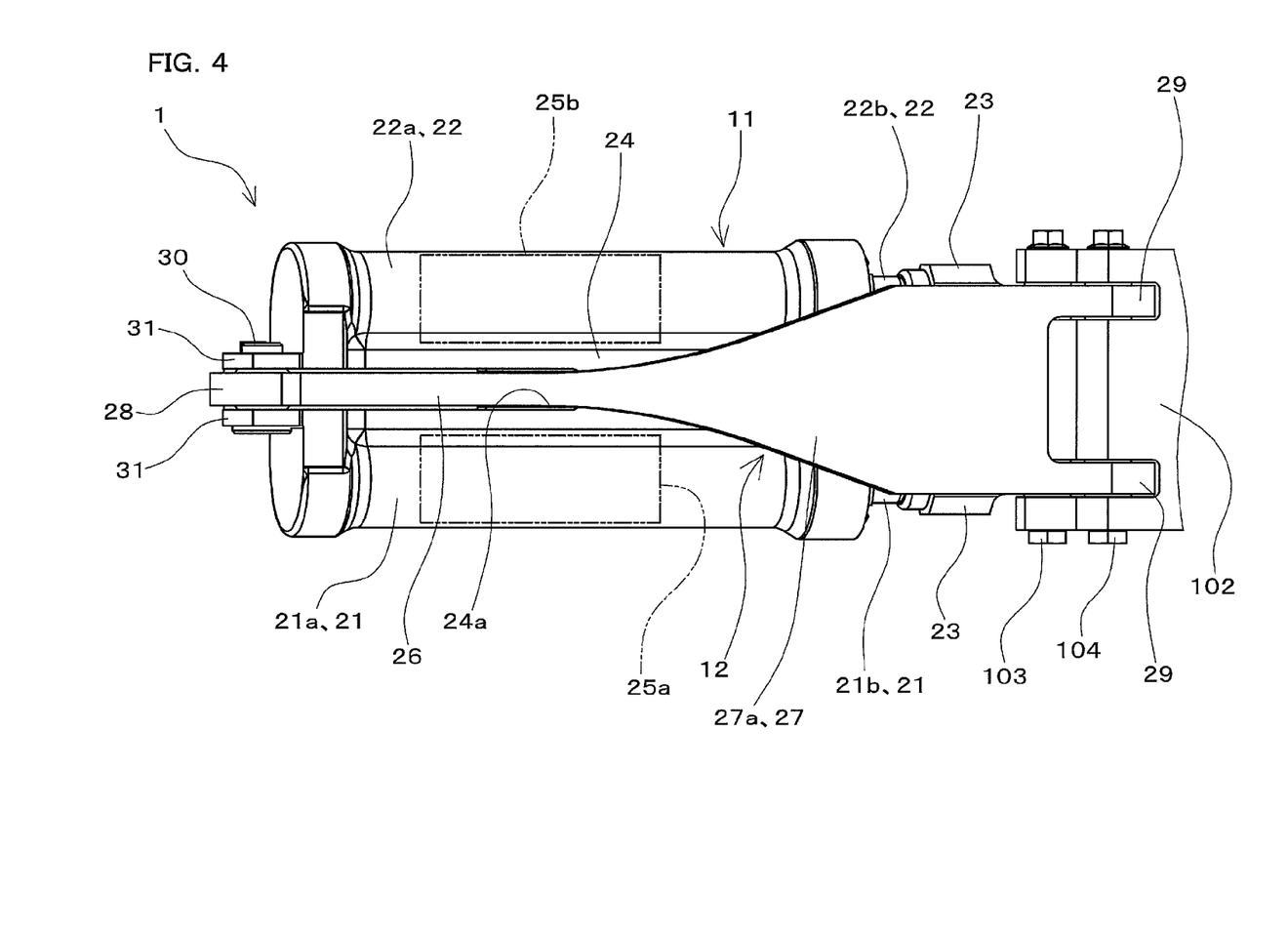
FIG. 4 is a plan view of the aircraft control surface drive mechanism shown in FIG. 2.

FIG. 2 is a perspective view of the control surface drive mechanism 1. FIG. 3 is a side view of the control surface drive mechanism 1. FIG. 4 is a plan view of the control surface drive mechanism 1. Note that in the illustrations in FIGS. 2 to 4, a portion of the control surface 102 is cut away. As shown in FIGS. 1 to 4, the control surface drive mechanism 1 is configured as a link mechanism including a hydraulically operated actuator 11 and a reaction link 12 connected to the actuator 11.

The actuator 11 is formed, for example, from a metallic material such as a titanium alloy, an aluminum alloy, or a stainless alloy. Also, the actuator 11 includes a plurality of (in this embodiment, two) cylinder units (21, 22), a rod end portion 23, and so forth. The cylinder units (21, 22) are respectively provided with cylinders (21a, 22a) and rods (21b, 22b). Specifically, the cylinder 21a and the rod 21b are provided in the cylinder unit 21, and the cylinder 22a and the rod 22b are provided in the cylinder unit 22.

The cylinder units (21, 22) are operated by supply and discharge of pressure oil to and from the inside of the cylinders (21a, 22a) configured as cylindrical portions. Note that pressure oil is supplied to the cylinders (21a, 22a) from a hydraulic apparatus (not shown) installed in the aircraft. By supply and discharge of pressure oil to and from the cylinders (21a, 22a), the rods (21b, 22b) formed as shaft-like members are driven such that they are displaced so as to extend and contract from or into the cylinders (21a, 22a).

The cylinder 21a of the cylinder unit 21 and the cylinder 22a of the cylinder unit 22 are installed at the wing 101 and the control surface 102 such that their longitudinal directions, in which they extend in a cylindrical form, extend parallel to each other. Also, the cylinder 21a and the cylinder 22a are formed integrally via a bridging portion 24 provided therebetween. That is, the plurality of cylinders (21a, 22a) of the actuator 11 are formed integrally.

Although this embodiment is described, taking, as an example, a configuration in which the plurality of cylinders (21a, 22a) and the bridging portion 24 are formed integrally, this need not be the case. It is possible to implement a configuration in which the plurality of cylinders (21a, 22a) are formed separately. It is also possible to implement a configuration in which a plurality of separately formed cylinders (21a, 22a) are joined integrally with a bridging portion formed as a separate block-shaped member.

The cylinder unit 21 is provided with a manifold structure 25a installed on the side of the cylinder 21a. Likewise, the cylinder unit 22 is provided with a manifold structure 25b installed on the side of the cylinder 22a. The manifold structures (25a, 25b) are provided with various valve mechanisms such as control valves for controlling supply and discharge of pressure oil to and from the inside of the cylinders (21a, 22a), various ports through which pressure oil passes, various oil passages, and so forth. Note that the illustration of the manifold structures (25a, 25b) has been omitted from FIG. 2, and is schematically shown by the two-dot chain line in FIG. 4.

The rod end portion 23 is provided as a unitary block-shaped member that joins the respective rods (21b, 22b) of the plurality of cylinder units (21, 22). Specifically, the rod end portion 23 is fixed to the distal end of the rod 21b that projects from the cylinder 21a and the distal end of the rod 21b that projects from the cylinder 22a. Thereby, the rod end portion 23 is installed so as to bridge the rod 21b and the rod 22b and connects the ends of the rods (21b, 22b) such that they are fixed to each other.

Further, a plurality of (in this embodiment, two) rotary connection portions 23a are formed integrally with the rod end portion 23. Each of the rotary connection portions 23a retains a bush serving as a cylindrical sliding member, or a bearing. Also, each of the rotary connection portions 23a is rotatably attached via the bush or the bearing to a columnar pivot shaft 103 attached to the control surface 102. Further, the rotary connection portions 23a are provided on the axial extension of the rods (21b, 22b) extending in a columnar shape.

As described above, due to the provision of the two rotary connection portions 23a installed at positions corresponding to the ends of the rods (21b, 22b), the rod end portion 23 is pivotably connected to the control surface 102. Thereby, the actuator 11 is pivotably attached to the control surface 102 at a first end thereof that the distal ends of the rods (21b, 22b) are located and at which the rod end portion 23 is provided. Also, the actuator 11 is connected pivotably to the control surface 102 in two locations at the first end.

The reaction link 12 is provided as a member for supporting a reaction force from the control surface 102 resulting from an output force from the actuator 11 that has been output to the control surface 102. Also, the reaction link 12 is provided so as to prevent a load received by the movable the control surface 102, which pivots relative to the wing 101, from directly affecting the fixed wing 101, to which the control surface 102 is supported pivotably.

The reaction link 12 is formed, for example, from a metallic material such as a titanium alloy, an aluminum alloy, or a stainless alloy. Note that the reaction link 12 need not be formed from a metallic material, and may be formed from a fiber reinforced plastic. Further, the reaction link 12 may be formed from a combination of a metallic material and a fiber reinforced plastic.

The reaction link 12 includes a shaft portion 26, a widened portion 27, an actuator attachment portion 28, a plurality of (in this embodiment, two) fulcrum shaft attachment portions (29, 29), and so forth. Also, in the reaction link 12, the actuator attachment portion 28, the shaft portion 26, the widened portion 27, and the plurality of fulcrum shaft attachment portions (29, 29) are serially arranged in this order. The direction of arrangement of these elements (28, 26, 27, 29) constitutes the longitudinal direction of the reaction link 12.

The shaft portion 26 is provided as a shaft-like structure extending linearly. In this embodiment, the cross section of the shaft portion 26 perpendicular to the longitudinal direction is shaped such that a pair of narrow flat plate-like portions that are provided parallel to each other and each have a substantially rectangular cross section are joined with a thick plate-like portion that is provided at the center in their width direction and substantially perpendicular thereto. Due to this cross sectional shape, the shaft portion 26 is configured to efficiently secure a geometrical moment of inertia and secure high rigidity while suppressing any increase in weight. Note that the shape of the shaft portion 26 need not be as described above. For example, the shaft portion 26 may take various shapes, including, for example, a columnar shape, a cylindrical shape, a prismatic shape, and the shape of a rectangular pipe.

Further, manifold structures (25a, 25b) are respectively disposed in spaces located on both lateral sides of the shaft portion 26. That is, the shaft portion 26 is installed between the manifold structure 25a installed for the cylinder 21a and the manifold structure 25b installed for the cylinder 22a.

The two fulcrum shaft attachment portions (29, 29) are each provided as a portion that is attached to a fulcrum shaft 104 rotatably supporting the control surface 102 to the wing 101 side. Each of the fulcrum shaft attachment portions 29 retains a bush serving as a cylindrical sliding member, or a bearing. Also, each of the fulcrum shaft attachment portions 29 is rotatably attached via the bush or the bearing to the fulcrum shaft 104. Further, the fulcrum shaft attachment portions 29 are installed at positions opposing the rotary connection portions 23a of the rod end portion 23.

Accordingly, the reaction link 12 is pivotably attached to the fulcrum shaft 104 at a first end thereof at which the two fulcrum shaft attachment portions (29, 29) are provided. That is, the reaction link 12 is pivotably attached to the fulcrum shaft 104 in two locations at the first end.

Note that the control surface 102 is rotatably supported to the wing 101 via the fulcrum shaft 104 or a shaft member installed coaxially with the fulcrum shaft 104. Further, the fulcrum shaft 104 and the pivot shaft 103 are provided such that their axial directions extend parallel to each other. Also, the distance dimension between the fulcrum shaft 104 and the pivot shaft 103 is appropriately set so as to secure a torque arm length required to drive the control surface 102 by causing the pivot shaft 103 to pivot about the fulcrum shaft 104 by operating the actuator 11.

The widened portion 27 is provided as a portion between the shaft portion 26 and the fulcrum shaft attachment portions 29 of the reaction link 12. Also, the widened portion 27 is provided so as to extend coaxially with the shaft portion 26. Further, the widened portion 27 is provided as a portion that is formed so as to spread in a width direction, which is perpendicular to the longitudinal direction of the reaction link 12, toward an end portion thereof at the first end of the reaction link 12 that is pivotably attached to the fulcrum shaft 104.

In this embodiment, the widened portion 27 is provided with a pair of plate-shaped portions (27a, 27b) and a connecting portion 27c. The pair of plate-shaped portions (27a, 27b) are provided as portions that are each formed in a plate shape and are provided so as to spread parallel to each other. Further, each of the plate-shaped portions (27a, 27b) is provided with a portion that is formed so as to spread in the shape of an isosceles triangle in the width direction toward the first end of the reaction link 12 and a portion extending in a fixed width. Note that the portion of each of the plate-shaped portions (27a, 27b) that extends in a fixed width is provided between the portion in the shape of an isosceles triangle and the fulcrum shaft attachment portions 29. Also, the portion extending in a fixed width is configured so as to extend in a fixed width, i.e., the width dimension of the base portion of the portion extending in the shape of an isosceles triangle, toward the first end of the reaction link 12.

The connecting portion 27c of the widened portion 27 is provided as a thick plate-like portion that is substantially vertically connected to each of the two parallel plate-shaped portions (27a, 27b) at the center of their width direction. By being provided in the above-described manner, the connecting portion 27c is configured to integrally connect the pair of plate-shaped portions (27a, 27b). Note that the shape of the widened portion 27 need not be as described above. For example, it is possible to implement a reaction link including a widened portion with each of the plate-shaped portions configured only by a portion spreading in the shape of an isosceles triangle in the width direction. Further, it is possible to implement a reaction link provided with a widened portion that is formed such that its cross section perpendicular to the longitudinal direction of the reaction link 12 has the shape of a rectangle and the length of the long sides of the rectangle increases toward the first end.

The actuator attachment portion 28 is provided as a portion that is pivotably attached to the second end of the actuator 11, which is opposite to the first end at which the rod end portion 23 is provided. The actuator attachment portion 28 retains a bush serving as a cylindrical sliding member, or a bearing. Also, the actuator attachment portion 28 is rotatably attached via the bush or the bearing to a connecting shaft 30 provided as a columnar pin member for rotatably connecting the actuator 11 and the reaction link 12 to each other.

Further, the actuator attachment portion 28 is rotatably attached to the connecting shaft 30 at a substantially central part in the axial direction. Also, the connection portions (31, 31) projecting from an end portion of the cylinders (21a, 22a) at the second end (opposite to the first end at which the rods (21b, 22b) project) further toward the second end are fixed and connected to both axial ends of the connecting shaft 30. That is, the connection portion 31 projecting from an end portion of the cylinder 21a at the second end is fixed to one axial end of the connecting shaft 30. The connection portion 31 projecting from an end portion of the cylinder 22a at the second end is fixed to the other axial end (the end opposite to the above-described axial end via the actuator attachment portion 28) of the connecting shaft 30. Note that the actuator attachment portion 28 may be fixed to the connecting shaft 30 and also the connection portions (31, 31) may be rotatably connected to the connecting shaft 30. Further, both the actuator attachment portion 28 and the connection portions (31, 31) may be rotatably attached to the connecting shaft 30.

Further, at the bridging portion 24, the actuator 11 is provided with a groove 24a that extends parallel to the cylinder units (21, 22) and is formed in the shape of a slot such that is open at an end toward the second end of the actuator 11. The shaft portion 26 of the reaction link 12 that is attached to the actuator 11 at the actuator attachment portion 28 is disposed, with a portion of the shaft portion 26 inserted in the groove 24a.

With the above-described configuration, the second end of the reaction link 12 at which the actuator attachment portion 28 is provided is pivotably attached to the second end of the actuator 11 between the plurality of cylinder units (21, 22). Also, the reaction link 12 is pivotably attached, in one location at the second end, to the second end of the actuator 11. Note that the actuator 11 and the reaction link 12 are rotatably supported to the wing 101 via the connecting shaft 30 or via a shaft member installed coaxially with the connecting shaft 30.

Next, the operation of the control surface drive mechanism 1 will be described. When the control surface 102 is driven, a hydraulic apparatus is operated in accordance with an instruction from a controller (not shown), and pressure oil is supplied and discharged to and from the cylinders (21a, 22a) of the cylinder units (21, 22) of the actuator 11. As a result of supplying/discharging pressure oil, the rods (21b, 22b) are displaced such that they extend and contract from or into the cylinders (21a, 22a).

Accordingly, the control surface 102 is driven by being biased from the rod end portion 23 to which the first end of the rods (21b, 22b) of the actuator 11 that are pivotable about the connecting shaft 30 is fixed. Then, as described above, the reaction link 12 is pivotably attached to the fulcrum shaft 104 at the first end, and is pivotably attached to the connecting shaft 30 at the second end. Consequently, the control surface 102 is driven by being pivoted about the fulcrum shaft 104.

As described thus far, with the control surface drive mechanism 1, the reaction link 12 is pivotably attached, at the first end, to the fulcrum shaft 104 on the control surface 102 side, and is pivotably attached, at the second end, to the actuator 11 between the plurality of cylinder units (21, 22). Accordingly, the control surface drive mechanism 1 can stably drive the control surface 102 via operation of the actuator 11, and can support a reaction force resulting from an output force from the actuator 11 with the reaction link 12.

Moreover, with the control surface drive mechanism 1, the reaction link 12 is connected, at the second end, to the actuator 11 between the cylinder units (21, 22), and therefore, the area surrounding the actuator 11 is widely open. That is, unlike conventional aircraft control surface drive mechanisms, the control surface drive mechanism 1 provides, in the area surrounding the actuator 11, wide open spaces, one of which is located laterally to the direction of arrangement of the cylinder units (21, 22), and the other is located perpendicularly to that direction of arrangement. Then, the manifold structures (25a, 25b) can be installed in these open spaces. Note that this embodiment describes, as an example, a configuration in which the manifold structures (25a, 25b) are installed in a space located perpendicularly to the direction of arrangement of the cylinder units (21, 22). Accordingly, with this embodiment, the installation space for the manifold structures (25a, 25b) can be arranged efficiently, and therefore, the overall compactness of the control surface drive mechanism 1 can be increased.

Thus, this embodiment enables efficient arrangement of the installation space for the manifold structures (25a, 25b), thus increasing the overall compactness of the aircraft control surface drive mechanism 1.

Furthermore, with the control surface drive mechanism 1, the plurality of cylinders (21a, 22a) of the actuator 11 are formed integrally, and therefore, it is possible to increase the rigidity of the actuator 11 while suppressing any increase in weight. This can efficiently ensure further stability of operation with a light-weight structure.

With the control surface drive mechanism 1, the rod end portion 23 is provided that joins the plurality of rods (21b, 22b) of the actuator 11 and is connected to the control surface 102 via the pivot shaft 103. Accordingly, it is possible to efficiently prevent the occurrence of a force fight in which the plurality of cylinder units (21, 22) bias the control surface 102 in opposite directions due to displacement between the positions of the rods (21b, 22b). This can efficiently achieve further stability of operation and the synchronization of operation.

With the control surface drive mechanism 1, the reaction link 12 is provided with the widened portion 27 that spreads in the width direction toward the first end attached to the fulcrum shaft 104, i.e., toward the control surface 102 side, such that the geometrical moment of inertia increases. Accordingly, it is possible to efficiently support, with the reaction link 12, a reaction force acting on the reaction link 12 from the control surface 102 as a result of an output force acting on the control surface 102 side from the actuator 11, while suppressing any increase in weight. In addition, since the widened portion 27 is provided at the first end of the reaction link 12, an open space is secured on the side of the shaft portion 26 provided at the second end of the reaction link 12. Accordingly, it is also possible to prevent a compromise of efficient arrangement of the installation space for the manifold structures (25a, 25b).

With the control surface drive mechanism 1, the reaction link 12 is connected to the fulcrum shaft 104 in two locations at the first end, and is connected to the actuator 11 in one location at the second end. Therefore, the reaction link 12 is connected to the actuator 11 side and the control surface 102 side at the vertex portions of a triangle. That is, the reaction link 12 is connected to the actuator 11 side and the control surface 102 side at the actuator attachment portion 28 and the two fulcrum shaft attachment portions (29, 29), which constitute the vertex portions of a triangle. Accordingly, it is possible to achieve a link structure that can further stably support, with the reaction link 12, a reaction force acting on an output force of the actuator 11 via the control surface 102.

With the control surface drive mechanism 1, the reaction link 12 is connected to the fulcrum shaft 104 in two locations at the first end, and is connected to the actuator 11 in one location at the second end. Also, the actuator 11 is connected to the control surface 102 side in two locations at the first end. Accordingly, the reaction link 12 and the actuator 11 are connected, at the vertex portions of a quadrangular pyramid, to the control surface 102 side and the wing 101 side to which the control surface 102 is rotatably attached. That is, the reaction link 12 and the actuator 11 are connected to the control surface 102 side and the wing 101 side at the two fulcrum shaft attachment portions (29, 29), the two rotary connection portions (23a, 23a), and the actuator attachment portion 28, which constitute the five vertex portions of a quadrangular pyramid. Accordingly, it is possible to achieve a link structure that can stably support any possible external force acting on the reaction link 12 and the actuator 11 in the bending direction or the torsional direction, and can suppress deformation caused by such external force. This allows the rigidity of the control surface drive mechanism 1 to be increased, while suppressing any increase in weight.

Although an embodiment of the present invention has been described thus far, the present invention is not limited to the embodiment described above, and various modifications may be made within the scope recited in the claims. For example, the following modifications are possible.

(1) Although the above embodiment has been described taking, as an example, a configuration in which a first end of the actuator is pivotably attached to the control surface, this need not be the case. For example, it is possible to implement a configuration in which a first end of the actuator is pivotably attached to a control surface-side member attached to the control surface. Note that a member that is fixed to the control surface and projects in an arm shape from the control surface can be used as the control surface-side member, for example.

(2) Although the above embodiment has been described taking, as an example, a configuration in which the manifold structures are installed in a space located perpendicularly to the direction of arrangement of the cylinder units, this need not be the case. For example, it is possible to implement a configuration in which the manifold structures are installed in a space located on the side of the direction of arrangement of the cylinder units.

(3) Although the above embodiment has been described taking, as an example, a configuration in which the rod end portion that joins the plurality of rods of the actuator is provided, this need not be the case. It is possible to implement a configuration in which the plurality of rods of the actuator are rotatably connected to the pivot shaft separately.

(4) Although the above embodiment has been described taking, as an example, a configuration in which the actuator and the reaction link are connected via the connecting shaft provided as a columnar pin member, this need not be the case. For example, a pair of projection-like shaft portions formed as columnar portions may be provided at the second end of the reaction link so as to project on both sides in the width direction, and the cylinders of the cylinder units of the actuator may be rotatably attached to this pair of shaft portions.

Figure 5:
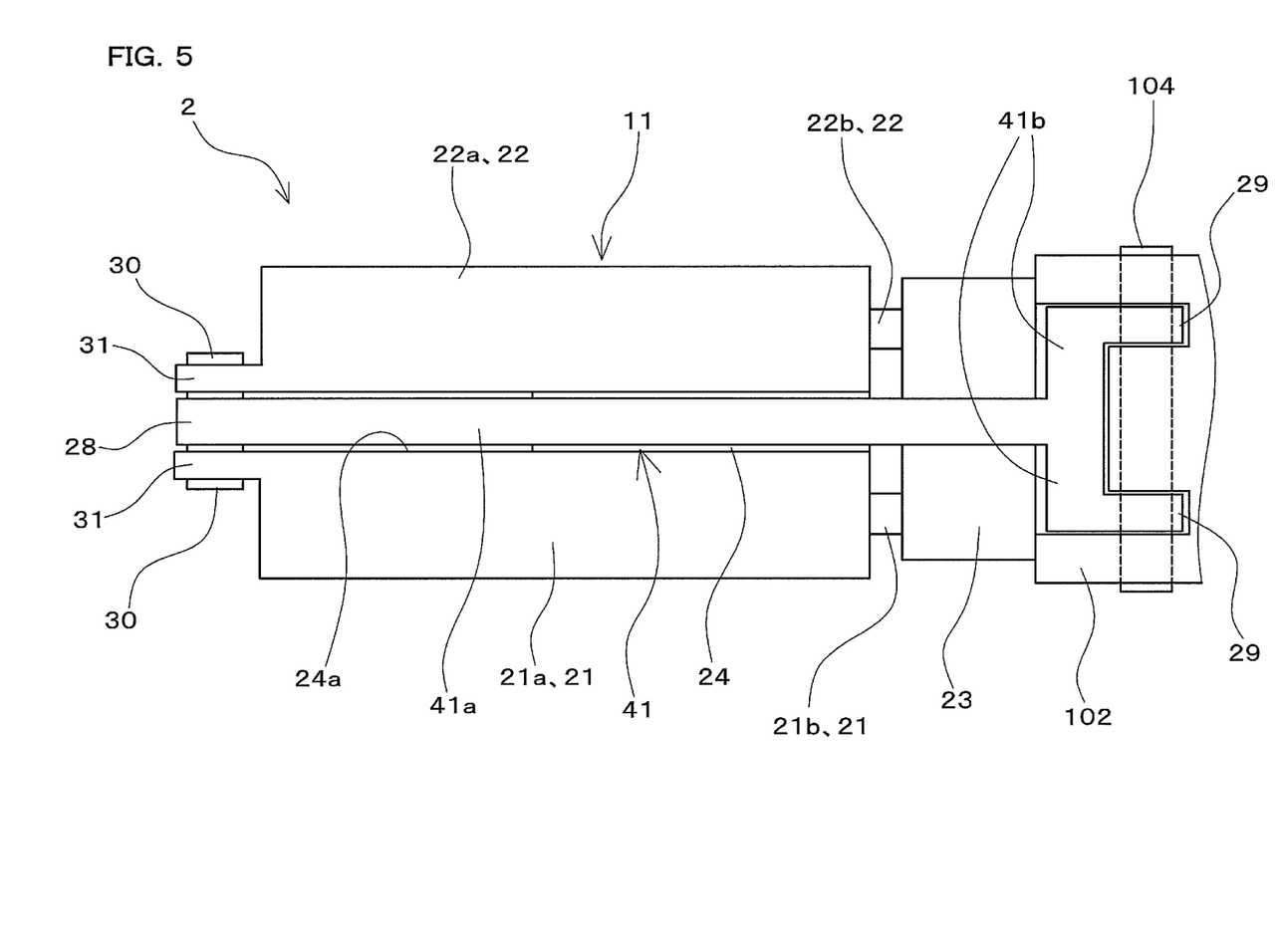
FIG. 5 is a plan view schematically showing an aircraft control surface drive mechanism according to a modification.
Figure 6:
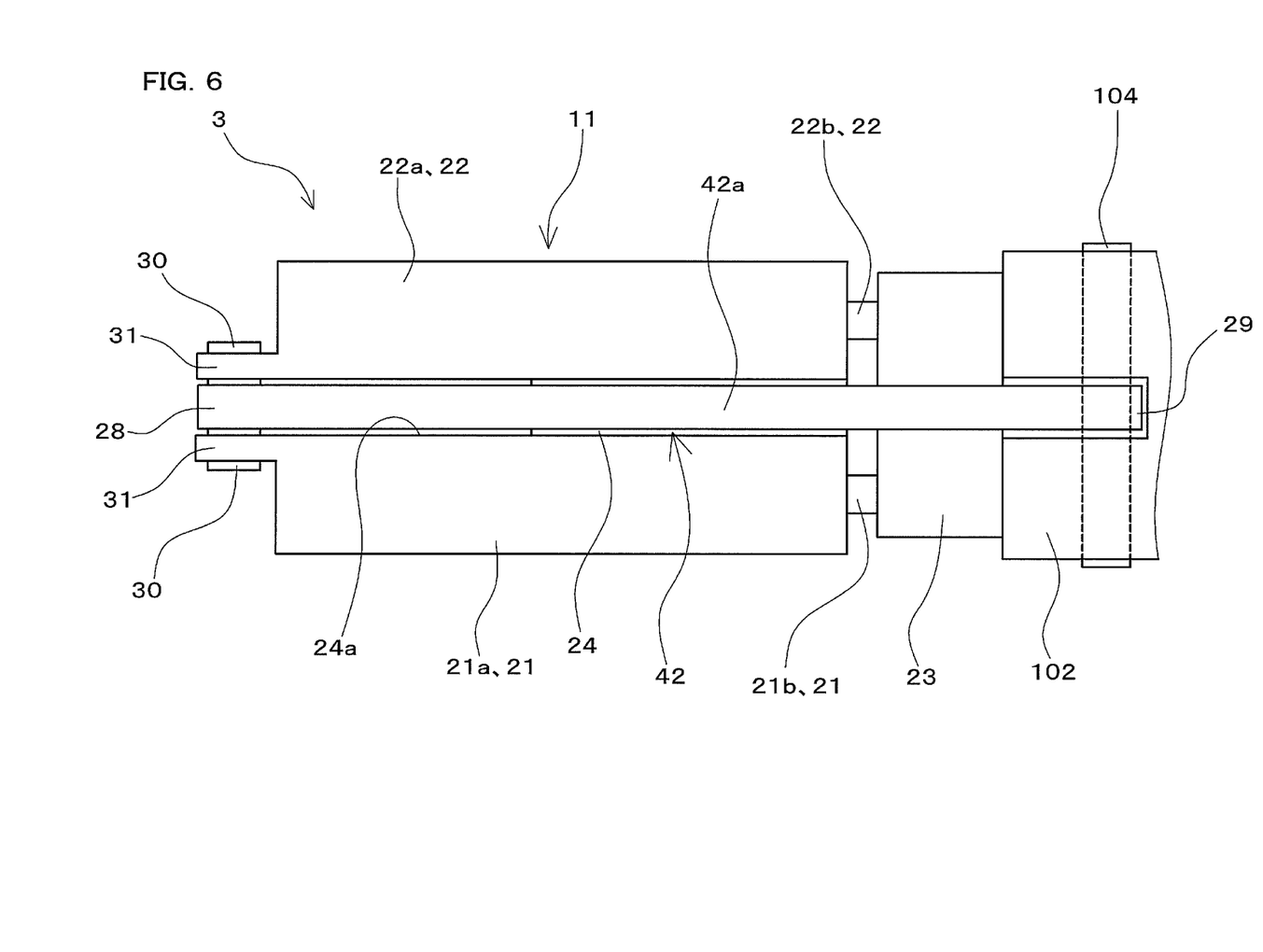
FIG. 6 is a plan view schematically showing an aircraft control surface drive mechanism according to a modification.

(5) The shape of the reaction link is not limited to those illustrated in the above-described embodiment, and various modifications may be made. FIG. 5 is a plan view schematically showing an aircraft control surface drive mechanism 2 (hereinafter, also simply referred to as the "control surface drive mechanism 2") according to a modification for the shape of the reaction link. FIG. 6 is a plan view schematically showing an aircraft control surface drive mechanism 3 (hereinafter, also simply referred to as the "control surface drive mechanism 3") according to another modification for the shape of the reaction link. Note that in the description of the control surface drive mechanisms (2, 3) according to the modifications shown in FIGS. 5 and 6, the configuration different from the above-described embodiment will be described. Those elements configured in the same manner as the above-described are denoted by identical reference numerals, and hence the description thereof has been omitted.

With the control surface drive mechanism 2 shown in FIG. 5, a reaction link 41 includes a shaft portion 41a, a branched portion 41b, an actuator attachment portion 28, and two fulcrum shaft attachment portions (29, 29). Unlike the reaction link 12 according to the above-described embodiment, the reaction link 41 is not provided with a widened portion. Also, the reaction link 41 is provided such that the shaft portion 41a whose cross section is shaped in the same manner as the shaft portion 26 of the reaction link 12 extends from an end portion thereof at the first end to an end portion thereof at the second end.

Further, the branched portion 41b that connects the shaft portion 41a and the two fulcrum shaft attachment portions (29, 29) is provided at the end portion of the shaft portion 41a of the reaction link 41 at the first end. The branched portion 41b is branched into two from the shaft portion 41a in a direction substantially orthogonal to the longitudinal direction of the shaft portion 41a, and is integrally connected to the fulcrum shaft attachment portions 29 at the branched tip ends.

With the control surface drive mechanism 3 shown in FIG. 6, a reaction link 42 includes a shaft portion 42a, an actuator attachment portion 28, and a fulcrum shaft attachment portion 29. Unlike the reaction link 41 of the control surface drive mechanism 2 shown in FIG. 5, the reaction link 42 is provided with only one fulcrum shaft attachment portion 29, and the branched portion is not provided. Also, the reaction link 42 is configured such that the shaft portion 42a formed in the same manner as the shaft portion 41a of the reaction link 41 extends from an end portion thereof at the first end to an end portion thereof at the second end, and integrally connects the fulcrum shaft attachment portion 29 and the actuator attachment portion 28.

As with the above-described embodiment, it is possible, with the above-described modification as well, to enable efficient arrangement of the installation space for manifold structures, thus increasing the overall compactness of the aircraft control surface drive mechanism.

(6) Although the above embodiment has been described taking, as an example, an aircraft control surface drive mechanism having a configuration in which two cylinder units are provided in the actuator and one reaction link is provided, this need not be the case. It is possible to implement an aircraft control surface drive mechanism having a configuration in which three or more cylinder units are provided in the actuator. Further, it is also possible to implement an aircraft control surface drive mechanism having a configuration in which two or more reaction links are provided.

Figure 7:
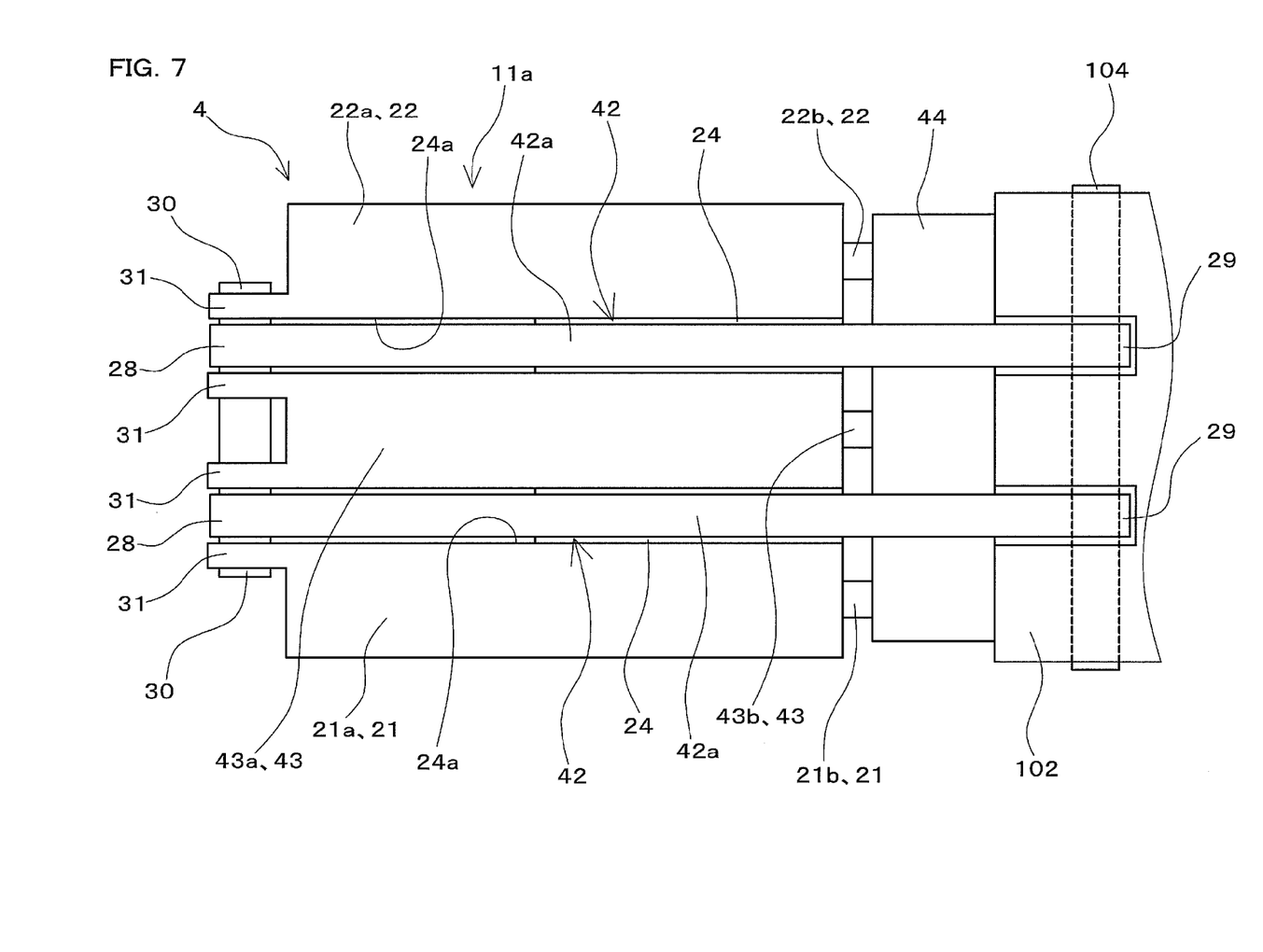
FIG. 7 is a plan view schematically showing an aircraft control surface drive mechanism according to a modification.

FIG. 7 is a plan view schematically showing an aircraft control surface drive mechanism 4 (hereinafter, also simply referred to as the "control surface drive mechanism 4") according to a modification for the number of cylinder units and reaction links installed. Note that in the description of the control surface drive mechanism 4 according to the modification shown in FIG. 7, the configuration different from the above-described embodiment and modifications will be described. Those elements configured in the same manner as the above-described are denoted by identical reference numerals, and hence the description thereof has been omitted.

The control surface drive mechanism 4 shown in FIG. 7 is provided with two reaction links (42, 42). The reaction links 42 of the control surface drive mechanism 4 are configured in the same manner as the reaction link 42 of the control surface drive mechanism 3 shown in FIG. 6. Also, the two reaction links (42, 42) are installed such that their longitudinal directions extend parallel to each other.

Further, an actuator 11a of the control surface drive mechanism 4 is provided with three cylinder units (21, 43, 22). Also, each of the cylinder units (21, 43, 22) of the control surface drive mechanism 4 is configured in the same manner as each of the cylinder units (21, 22) of the control surface drive mechanism 1 in the above-described embodiment. That is, a cylinder 43a and a rod 43b of the cylinder unit 43 are configured in the same manner as the cylinders (21a, 22a) and the rods (21b, 22b) of the cylinder units (21, 22).

With the control surface drive mechanism 4, the cylinder unit 43 is installed between the cylinder units (21, 22), parallel to the cylinder units (21, 22). The cylinder 21a of the cylinder unit 21 and the cylinder 43a of the cylinder unit 43 are formed integrally via a bridging portion 24. Furthermore, the cylinder 22a of the cylinder unit 22 and the cylinder 43a of the cylinder unit 43 are formed integrally via the bridging portion 24. Accordingly, three cylinders (21a, 43a, 22a) are formed integrally in the actuator 11a of the control surface drive mechanism 4.

The second end of one of the two reaction links (42, 42) is pivotably attached to the second end of the actuator 11a between two cylinder units (21, 43). Also, the second end of the other reaction link 42 is pivotably attached to the second end of the actuator 11a between two cylinder units (43, 22).

The actuator 11a of the control surface drive mechanism 4 is provided with a rod end portion 44 serving as a unitary block-shaped member that joins the respective rods (21b, 43b, 22b) of the three cylinder units (21, 43, 22). Also, the rod end portion 44 is pivotably connected to the control surface 102 by the provision of three rotary connection portions installed at positions corresponding to the end portions of the rods (21b, 43b, 22b). Note that the rotary connection portions of the rod end portion 44 are configured in the same manner as the rotary connection portions 23a of the rod end portion 23 of the control surface drive mechanism 1 according to the above-described embodiment.

As with the above-described embodiment, it is possible, with the above-described modification as well, to enable efficient arrangement of the installation space for manifold structures, thus increasing the overall compactness of the aircraft control surface drive mechanism.

The present invention is widely applicable to an aircraft control surface drive mechanism for driving a control surface of an aircraft. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft control surface drive mechanism that is provided as a link mechanism comprising a hydraulically operated actuator and a reaction link connected to the actuator, and that drives a control surface of an aircraft,
   wherein the actuator includes a plurality of cylinder units each including a cylinder and a rod, and is pivotably attached, at a first end thereof, to the control surface or a control surface-side member attached to the control surface, and
   the reaction link is pivotably attached, at a first end thereof, to a fulcrum shaft rotatably supporting the control surface, and is pivotably attached, at a second end thereof, to a second end of the actuator between the plurality of cylinder units.

2. The aircraft control surface drive mechanism according to claim 1,
   wherein the plurality of cylinders of the actuator are formed integrally or joined integrally.

3. The aircraft control surface drive mechanism according to claim 1,
   wherein the actuator further includes a rod end portion that joins the respective rods of the plurality of cylinder units and that is pivotably connected to the control surface or the control surface-side member.

4. The aircraft control surface drive mechanism according to claim 1,
   wherein the reaction link is provided with a widened portion that is formed so as to spread in a width direction, which is a direction perpendicular to a longitudinal direction of the reaction link, toward an end portion thereof at the first end pivotably attached to the fulcrum shaft.

5. The aircraft control surface drive mechanism according to claim 1,
wherein the reaction link is pivotably attached, in two locations at the first end, to the fulcrum shaft, and is pivotably attached, in one location at the second end, to the second end of the actuator.

6. The aircraft control surface drive mechanism according to claim 5,
wherein the actuator is pivotably connected, in two locations at the first end, to the control surface or the control surface-side member.

* * * * *